Oct. 28, 1952     H. J. McCREARY     2,616,074
APPARATUS FOR UTILIZING THE HALL EFFECT
Filed April 10, 1950
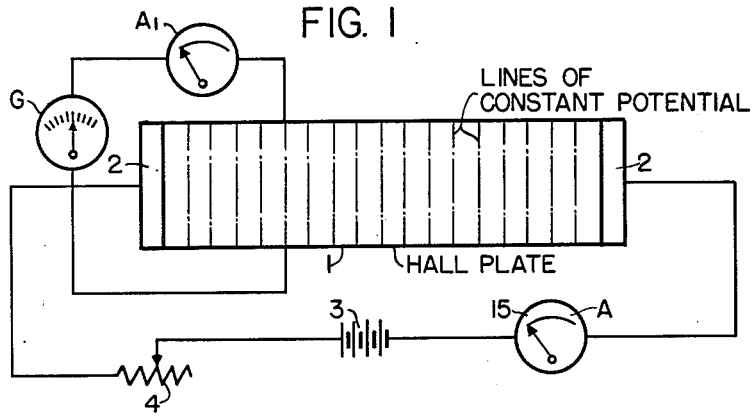
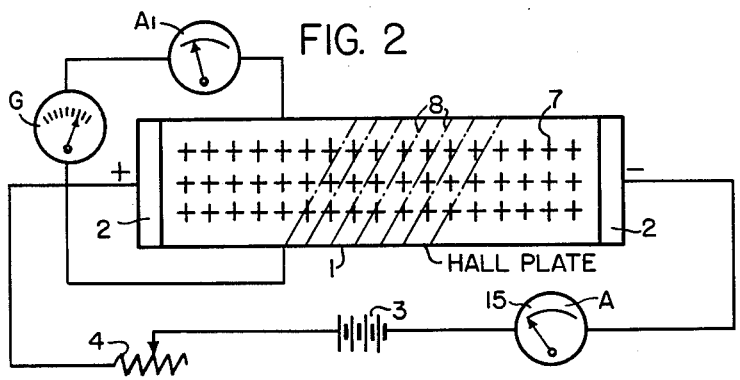
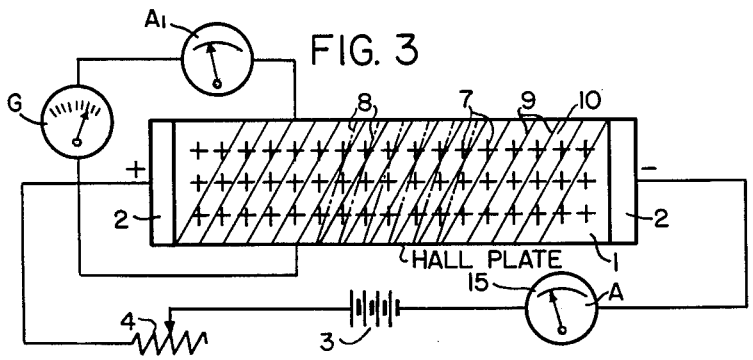
*INVENTOR.*
HAROLD J. McCREARY
BY
ATTORNEY Patented Oct. 28, 1952

2,616,074

UNITED STATES PATENT OFFICE 2,616,074

APPARATUS FOR UTILIZING THE HALL EFFECT

Harold J. McCreary, Lombard, Ill., assignor to Automatic Electric Laboratories, Inc., Chicago, Ill., a corporation of Delaware Application April 10, 1950, Serial No. 155,099

8 Claims. (Cl. 323—94)

This invention relates in general to that phenomenon known as the Hall effect and more particularly to an apparatus and method for effecting an increased change of resistance in a Hall circuit.

The Hall effect, discovered by E. H. Hall about 1879, in brief is characterized in that when a given current of electricity is passed lengthwise thru a metal plate which is subjected to a magnetic field passing at right angles therethru, there occurs an angular rotation of the lines of equipotential which exist across the plate transverse to the direction of current flow. This is borne out by the fact that a galvanometer, connected to the Hall plate at points directly opposite one another on a line normal to the current flow and when no magnetic field is present, shows no deflection while when subjected to a magnetic field, shows a definite deflection, the magnetic field being at right angles to the plate.

Since that time many different types of metallic elements have been employed for the Hall plate. Presently, the best results are obtained by employing as the Hall plate a thin sheet of germanium. Even so however, the change of resistance across the plate in either direction due to the rotational effect has been of such a minute nature that little if any practical or commercial use has been made of the discovery.

For his chief object, applicant therefore has the design of an apparatus and a method for greatly changing the resistance in the Hall circuit.

It is a further object of this invention to so increase this change in electrical condition as to make it of practical value and application for example in electronic circuits as an amplifier.

A feature of the invention then lies in its practical applicability as a new non-thermionic valve or translating device.

These and other objects and features will be more particularly brought out in the ensuing specification taken in conjunction with the accompanying drawings in which:

Fig. 1 is a diagrammatic view of a conventional Hall plate with a given current passing lengthwise therethru and showing in dot dashed lines the position of lines of equipotential thereon, normal to the current flow.

Fig. 2 is a diagrammatic view of conventional Hall plate as in Fig. 1 except that a magnetic field has been impressed at right angles therethru, small + marks indicating tails of directional arrows of magnetic flux and so also indicating the direction thereof, into the drawing, and the dot dashed lines showing the angularly rotated position of the lines of equipotential.

Fig. 3 is a diagrammatic view of the improved Hall plate, the thin angularly parallel lines indicating line like strips of high electrical conductivity within or upon the Hall plate along the lines of the rotated lines of equipotential as shown in Fig. 2.

The circuits shown with the apparatus in Figs. 1 and 2 are obvious and need no explanation. Galvanometers and ammeters, marked G, A and $A_1$, show the condition of the circuits.

Referring again to the drawings and particularly to Fig. 3, a detailed description of the invention follows.

Numeral 1 represents a well known Hall plate which conventionally may be about an inch wide and .003 inch thick. Any material having a large Hall co-efficient may be used. Although germanium is preferable, such elements as bismuth may be employed. At either end of the Hall strip 1 are distributor strips 2 electrically and mechanically affixed thereto and these may be of any good electrically conductive metal. To these two strips 2 are centrally connected leads so that a source of potential 3 may be applied thereto. At this point lines of equipotential across the Hall plate will be parallel to one another and normal to the line of current flow, and if a galvanometer G such as is shown in the drawings is connected across the lengthwise edges of the plate on a line normal to the current flow, no deflection occurs since there is no difference in potential therebetween. A source of magnetic flux is now imposed on the Hall plate 1 so that the lines of force cut the plate 1 at right angles to it. The lines of force are represented directionally as into the drawings by the + marks 7 representing directional tails of arrows of force. For a given current and flux density, the lines of equipotential now rotate angularly and are shown by the dot dashed lines 8 in Fig. 2. A galvanometer G now connected across the plate as shown in Fig. 2 will register a difference in potential while ammeter A in Fig. 2, shows a small current flow. Up to this point the procedure is well known and established.

Along the rotated lines of equipotential on the Hall plate 8 (Fig. 2) applicant now places thin high electrically conductive elements. One embodiment might be to plate thin lines 9 of (Fig. 3) silver thereon. However, any good conductor may be affixed thereon in any suitable manner and applicant does not limit his invention merely to silver plating of the lines. Still another embodiment would be to imbed fine wires or rods of high electrical conductivity within the Hall plate itself, all parallel and at a given angular degree of rotation.

Having so constructed the new type Hall plate, any variation of either the current flowing lengthwise thru the plate as by changing the resistance 4 or variation of the intensity of the magnetic field 7 will cause the rotation of the lines of equipotential 8 to change and the fixed lines of conducting material 9 then no longer run along the rotated constant potential lines 8, but now cross these lines, whereupon the fixed conductor lines 9 offer a low resistance path of gradient potential along themselves for the flow of current. There is therefore, a great change in resistance across the Hall plate and this change of resistance is greatly amplified by this invention, as is shown by increased current flow at ammeter A, in Fig. 3.

Having described my invention in detail, what I claim and desire to protect by issuance of Letters Patent of the United States is:

1. In a "Hall effect" type apparatus of the class wherein an electrical current flows in a given direction lengthwise thru a metal plate having a high Hall coefficient and having a magnetic field impressed upon the plate at right angles thereto angularly rotating the lines of equipotential which are normal to the direction of the current flow an amount corresponding to the intensity of the flow of current and the flux density of the magnetic field, the combination with said plate of fine line elements of high electrical conductivity positioned along said rotated lines of equipotential corresponding to a given current flow and flux density so that a small variation in either current flow or flux density will cause said angularly rotated lines of equipotential to change their angular rotation to a position corresponding to the varied conditions, thereby crossing said highly conductive elements, said elements then providing low resistance paths between the lines of equipotential corresponding to said varied conditions causing a great change in resistance across said plate.

2. In a "Hall effect" type apparatus as claimed in claim 1, said fine line elements of high electrical conductivity electrically and mechanically attached onto a surface of said plate.

3. In a "Hall effect" type apparatus as claimed in claim 2, said fine line elements being plated onto a surface of said plate.

4. In a "Hall effect" type apparatus as claimed in claim 1, said fine line elements of high electrical conductivity comprising fine rods or wires imbedded within said plate.

5. In a "Hall effect" type apparatus as claimed in claim 1, said plate comprising a thin sheet of germanium.

6. In a "Hall effect" type apparatus as claimed in claim 1, said plate comprising a thin sheet of bismuth.

7. In a "Hall effect" type apparatus as claimed in claim 1, said line elements of high electrical conductivity being silver.

8. In a "Hall effect" type apparatus of the class wherein an electrical current flows in a given direction lengthwise thru a thin plate of germanium and having a magnetic field impressed upon the plate at right angles thereto angularly rotating lines of equipotential transverse to the direction of current flow an amount corresponding to the intensity of the flow of current and the flux density of the magnetic field, the combination with said plate of germanium of fine lines of silver positioned along said lines of equipotential corresponding to a given current flow and flux density and electrically and mechanically affixed to a surface of said plate so that a small variation in either current flow or flux density will cause said angularly rotated lines of equipotential to change their position to one corresponding to the varied conditions, thereby crossing said fine silver lines, said silver lines then providing low resistance paths between said lines of equipotential corresponding to said varied conditions causing a great change in resistance lengthwise across said plate.

HAROLD J. McCREARY.

REFERENCES CITED

The following references are of record in the file of this patent:

UNITED STATES PATENTS

| Number | Name | Date |
| --- | --- | --- |
| 1,900,018 | Lilienfield | Mar. 7, 1933 |